US009724680B2

(12) United States Patent
Lai et al.

(10) Patent No.: US 9,724,680 B2
(45) Date of Patent: Aug. 8, 2017

(54) FIBER REINFORCED ZEOLITE EXTRUDATES WITH ENHANCED PHYSICAL PROPERTIES

(71) Applicants: Wenyih Frank Lai, Bridgewater, NJ (US); Nicholas S. Rollman, Hamburg, PA (US)

(72) Inventors: Wenyih Frank Lai, Bridgewater, NJ (US); Nicholas S. Rollman, Hamburg, PA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 613 days.

(21) Appl. No.: 14/074,954

(22) Filed: Nov. 8, 2013

(65) Prior Publication Data

US 2014/0162866 A1 Jun. 12, 2014

Related U.S. Application Data

(60) Provisional application No. 61/734,442, filed on Dec. 7, 2012.

(51) Int. Cl.
*B01J 29/70* (2006.01)
*B01J 29/04* (2006.01)
(Continued)

(52) U.S. Cl.
CPC ........... *B01J 29/703* (2013.01); *B01J 29/041* (2013.01); *B01J 29/06* (2013.01); *C04B 28/06* (2013.01);
(Continued)

(58) Field of Classification Search
None
See application file for complete search history.

(56) References Cited

U.S. PATENT DOCUMENTS 3,354,078 A 11/1967 Miale et al.
3,795,631 A 3/1974 Heinze et al.
(Continued)

FOREIGN PATENT DOCUMENTS

DE 10247314 A1 6/2004
EP 0043996 B1 12/1983
WO 9200143 A1 1/1992

OTHER PUBLICATIONS

Weisz et al., "Superactive crystalline aluminosilicate hydrocarbon catalysts", Journal of Catalysis, Aug. 1965, vol. 4, iss. 4, pp. 527-529, Science Direct, Elsevier.
(Continued)

*Primary Examiner* — Colin W Slifka
(74) *Attorney, Agent, or Firm* — Liza Negron

(57) ABSTRACT

The invention relates to a method of making a reinforced catalytic microporous and/or mesoporous bound composition comprising the steps of: providing a pre-formed catalytic crystalline material; mixing the catalytic crystalline material with water, a metal oxide binder, and a reinforcing glass fiber to form an extrudable composition; extruding the extrudable slurry under conditions sufficient to form the reinforced catalytic bound extrudate; and calcining the reinforced catalytic bound extrudate at a temperature and for a time sufficient to form a calcined reinforced catalytic bound catalyst. Advantageously, the reinforcing glass fiber can have a diameter from 5-100 microns and a length-to-diameter ratio from 300:1-3000:1 and can be present in an amount from about 1-50 parts, based on about 1000 parts combined of catalytic crystalline material and metal oxide binder.

9 Claims, 4 Drawing Sheets

(51) Int. Cl.

| | |
|---|---|
| B01J 29/06 | (2006.01) |
| C04B 28/06 | (2006.01) |
| C04B 35/16 | (2006.01) |
| C04B 35/626 | (2006.01) |
| C04B 35/63 | (2006.01) |
| C04B 35/82 | (2006.01) |
| C10G 29/20 | (2006.01) |
| C10G 45/64 | (2006.01) |
| B01J 29/068 | (2006.01) |
| B01J 29/072 | (2006.01) |
| B01J 29/076 | (2006.01) |
| B01J 35/00 | (2006.01) |
| B01J 35/06 | (2006.01) |
| B01J 35/10 | (2006.01) |
| B01J 37/00 | (2006.01) |

(52) U.S. Cl.
CPC .......... *C04B 35/16* (2013.01); *C04B 35/6263* (2013.01); *C04B 35/62695* (2013.01); *C04B 35/6303* (2013.01); *C04B 35/82* (2013.01); *C10G 29/205* (2013.01); *C10G 45/64* (2013.01); *B01J 29/068* (2013.01); *B01J 29/072* (2013.01); *B01J 29/076* (2013.01); *B01J 35/002* (2013.01); *B01J 35/06* (2013.01); *B01J 35/1019* (2013.01); *B01J 37/0009* (2013.01); *B01J 2229/36* (2013.01); *B01J 2229/42* (2013.01); *C04B 2235/3218* (2013.01); *C04B 2235/5264* (2013.01); *C04B 2235/5296* (2013.01); *C04B 2235/606* (2013.01); *C04B 2235/6021* (2013.01); *C04B 2235/662* (2013.01); *C04B 2235/72* (2013.01); *C10G 2400/02* (2013.01); *C10G 2400/04* (2013.01); *C10G 2400/30* (2013.01)

(56) References Cited

U.S. PATENT DOCUMENTS

| | | | |
|---|---|---|---|
| 5,387,564 | A | 2/1995 | Takeuchi et al. |
| 2003/0191343 | A1* | 10/2003 | Yunoki ................. B01J 23/002 562/535 |
| 2003/0191344 | A1* | 10/2003 | Yunoki ................. B01J 23/002 562/546 |
| 2006/0103045 | A1* | 5/2006 | O'Brien-Bernini . B29C 47/0004 264/45.9 |
| 2007/0134146 | A1* | 6/2007 | Bull .................... B01D 53/9418 423/239.2 |
| 2007/0259770 | A1* | 11/2007 | Hofmann ........... B01D 53/9418 502/60 |
| 2010/0137666 | A1 | 6/2010 | Yamada et al. |
| 2010/0184591 | A1 | 7/2010 | Noh et al. |

OTHER PUBLICATIONS

Miale et al., "Catalysis by crystalline aluminosilicates: IV. Attainable catalytic cracking rate constants, and superactivity", Journal of Catalysis, Oct. 1966, vol. 6, iss. 2, pp. 278-287, Science Direct, Elsevier.

Johnson, "Estimation of the zeolite content of a catalyst from nitrogen adsorption isotherms", Journal of Catalysis, May 1978, vol. 53, iss. 3, pp. 425-431, Science Direct, Elsevier.

Olson, et al., "Chemical and Physical Properties of the ZSM-5 Substitutional Series", Journal of Catalysis, Feb. 1980, vol. 61, iss. 2, pp. 390-396, Science Direct, Elsevier.

* cited by examiner

FIBER REINFORCED ZEOLITE EXTRUDATES WITH ENHANCED PHYSICAL PROPERTIES

CROSS-REFERENCE TO RELATED APPLICATIONS

This application claims the benefit of U.S. Provisional Application Ser. No. 61/734,442 filed on Nov. 7, 2012; which is incorporated herein in its entirety by reference.

FIELD OF THE INVENTION

The invention relates to fiber-reinforced catalytic extrudates, such as bound zeolitic catalyst materials, their methods of making, and the enhancement of certain properties as a result of their fiber reinforcement.

BACKGROUND OF THE INVENTION

Though there are several conventional methods of making zeolitic catalyst compositions, including powder synthesis, many are made commercially through a relatively high solids process by forming an extrudate. For catalyst compositions that experience mechanical stresses, e.g., pressurization in reaction vessels, etc., some mechanical and physical properties of the extrudates can translate to the calcined (activated) catalyst material and can be critical for designing/manufacturing a desired commercial catalyst. Without limitation, these can include crush strength, surface area, density, and L/D. Typically, finished extrudates with low relative L/D ratio and low relative crush strength may cause an excessive pressure drop through the reactor bed. Furthermore, the loading of extrudate (per unit weight or volume) can generally increase dramatically with decreasing L/D. Conventionally for catalyst materials, the inclusion of, or increase in content of, binder could be modified to address mechanical or physical properties of catalyst materials. Another conventional way to deal with less desirable properties includes changing reactor conditions (pressure drop, flux, circulation rate, etc.) to reduce the mechanical stresses on the catalyst materials. However, such changes in reactor conditions can result in significantly lower catalytic and/or product yields, which can be even more undesirable.

Thus, an alternate mechanism for improving certain physical and/or mechanical properties of catalytic materials is sought. In particular, it can be desirable for one or more of crush strength, surface area, density, and L/D to be improved without taking away from catalytic activity. In the description hereinbelow, the use of metal oxides fibers as reinforcement is explored for further improvement in mechanical properties.

Though some short fibers (such as glass fibers) are known as relatively inert fillers, they typically do not provide any additional mechanical stability and can occasionally degrade mechanical properties, particularly if they do not encourage cohesion with the other components of the catalytic material. On the other hand, fibers that are relatively long can provide some additional mechanical strength, but typically only at relatively high loadings, which can then cause problems with extrusion. Therefore, a compromise is sought to attain increased mechanical stability without relatively high loadings of (otherwise inert) reinforcing agents and without significant effect on the catalytic extrudate.

SUMMARY OF THE INVENTION

One aspect of the invention relates to a method of making a reinforced catalytic microporous and/or mesoporous bound composition comprising the steps of:

providing a catalytic crystalline microporous and/or mesoporous material formed from processing at least a source of tetravalent atoms, Y, and a source of trivalent atoms, X, under sufficient crystallization conditions, and optionally calcined under sufficient conditions; mixing the catalytic crystalline microporous and/or mesoporous material with water, a metal oxide binder comprising alumina, silica, magnesia, titania, zirconia, or a combination thereof, and a reinforcing glass fiber having a diameter from 5 microns to 100 microns and a length-to-diameter ratio from 300:1 to 3000:1 to form an extrudable composition (e.g., slurry), wherein the reinforcing glass fiber is present in an amount from about 1 part to about 50 parts by weight, based on about 1000 parts by weight combined of catalytic crystalline material and metal oxide binder; extruding the extrudable slurry under conditions sufficient to orient the reinforcing glass fiber and to form the reinforced catalytic microporous and/or mesoporous bound extrudate; and calcining the reinforced catalytic microporous and/or mesoporous bound extrudate at a temperature and for a time sufficient to form a calcined reinforced catalytic microporous and/or mesoporous bound catalyst, wherein the reinforced catalytic microporous and/or mesoporous bound extrudate, before calcining, exhibits a reinforced length-to-diameter ratio after a 3×6' drop test, and wherein a catalytic microporous and/or mesoporous bound extrudate, before calcining, identical to its reinforced version except for the absence of any reinforcing glass fiber, exhibits an unreinforced length-to-diameter ratio after a 3×6' drop test, such that the reinforced length-to-diameter ratio after the drop test is from about 10% to about 75% greater than the unreinforced length-to-diameter ratio after the drop test.

DETAILED DESCRIPTION OF THE EMBODIMENTS

Figure 1A:
FIG. 1A graphically shows an optical photograph of cut E-glass fibers according to the invention.
Figure 1B:
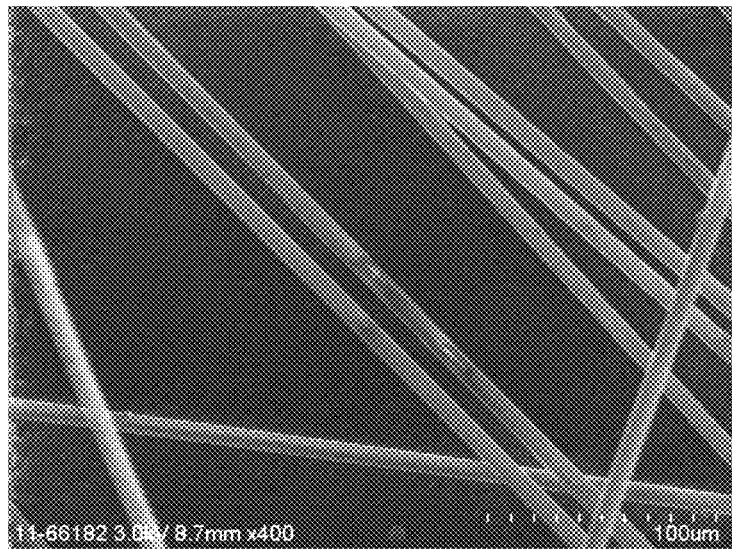
FIG. 1B shows a scanning electron microscope (SEM) image of several of the cut E-glass fibers shown in FIG. 1A.

An aspect of the invention relates to methods of making a reinforced catalytic microporous and/or mesoporous bound composition having improved physical properties, particularly as it relates to retention of a length-to-diameter ratio of extruded material, which is believed to strongly correlate with attrition resistance, a tendency to become crushed during catalytic service, and/or a tendency to induce a significant pressure drop (e.g., due to densification) in the catalytic reactor during catalytic service).

The methods according to the invention can advantageously comprise the step of providing a catalytic crystalline microporous and/or mesoporous starting material. The catalytic crystalline starting material can, in most embodiments, be formed from processing a reaction mixture comprising at least a source of tetravalent atoms, Y, and a source of trivalent atoms, X, but can typically also include a slurrying medium such as water, in most cases a structure directing agent (template), optionally a source of additional atoms desired to be in the crystalline framework, optionally a pH modifier (e.g., an acid and/or a base) and/or a source of alkali or alkali earth atoms (e.g., to stabilize the reaction mixture), and optionally seeds (e.g., to facilitate/speed up the formation/crystallization process). The processing of the reaction mixture can generally occur under sufficient conditions to obtain a crystalline product, e.g., having a commercially acceptable yield such as at least 20 wt % (e.g., at least 30 wt %, at least 40 wt %, at least 50 wt %, at least 60 wt %, at least 70 wt %, or at least 75 wt %), which crystalline product can optionally but preferably be isolated and then optionally but preferably also calcined under sufficient conditions, e.g., to substantially remove/decompose any organic.

In various embodiments, the tetravalent Y atoms can include Si, Ge, Sn, Pb, Ti, Zr, Hf, Mn, Co, Ce, Pr, or a combination thereof, preferably including at least Si and/or Ge, such as including at least Si or being Si. The source(s) of the tetravalent Y atoms can include, but are not limited to, oxides, hydroxides, nitrides, sulfides, nitriles, carbides, carbonates, carboxylates, carbonyls, oxyhydroxides, oxynitrides, amides, or the like, or combinations or reaction products thereof. However, regardless of the source(s) of the tetravalent Y atoms, ratios regarding Y atoms and the other respective components/ingredients of the catalytic crystalline material are usually expressed in terms of the tetravalent oxide ($YO_2$) form, unless otherwise specified.

In various embodiments, the trivalent X atoms can include B, Al, Ga, In, Tl, Sc, Y, Fe, a Lanthanide (except Ce or Pr), or a combination thereof, preferably including at least Al and/or B, such as including at least Al or being Al. The source(s) of the trivalent X atoms can include, but are not limited to, oxides, hydroxides, nitrides, sulfides, nitriles, carbides, carbonates, carboxylates, carbonyls, oxyhydroxides, oxynitrides, amides, or the like, or combinations or reaction products thereof. However, regardless of the source(s) of the trivalent X atoms, ratios regarding X atoms and the other respective components/ingredients of the catalytic crystalline material are usually expressed in terms of the trivalent oxide ($X_2O_3$) form, unless otherwise specified.

In some embodiments, it may be desirable for one or more additional atoms to be incorporated into the crystal structure/framework of the catalytic crystalline material. As most catalytic crystalline materials have at least partially oxidic structures, it should be understood that the "additional atoms" herein exclude the ubiquitous oxygen that is nonetheless relatively omnipresent in such catalytic crystalline materials. In such embodiments, the additional atom(s) can include, but are not limited to, divalent atoms (e.g., Be, Mg, Ca, Sr, Ba, Ni, Cu, Zn, Cd, or the like, or combinations thereof), pentavalent atoms (e.g., P, As, Sb, Bi, V, Nb, Ta, or the like, or combinations thereof), hexavalent atoms (e.g., Se, Te, Cr, Mo, W, or the like, or combinations thereof), or the like, or combinations thereof. Additionally or alternately, it may be desirable for the reaction mixture to include one or more alkali and/or alkali earth atoms, e.g., that do not get incorporated into the crystal structure/framework but that can serve to balance charge mismatches resulting from the presence of trivalent (and/or other non-tetravalent) atoms within the crystal structure/framework of the catalytic crystalline material. In such embodiments when the alkali and/or alkali earth atoms are present, they can advantageously include at least Li, Na, and/or K atoms, preferably at least Na and/or K atoms.

Crystallization of materials (zeolites) from the above reaction mixture can be carried out at either static or stirred conditions in a suitable reactor vessel (e.g., polypropylene jars or Teflon™-lined or stainless steel autoclaves), e.g., at a temperature from about 100° C. to about 200° C. for a time sufficient for crystallization to occur at the temperature used (e.g., from about 2 hours to about 500 hours or from about 10 hours to about 100 hours). Thereafter, the crystals can be separated from the liquid and recovered.

Appropriate calcining conditions for the reaction mixture can advantageously include those that substantively accomplish one or more of the following goals: removing and/or decomposing any remaining SDA; removing and/or decomposing any residual organic matter; driving off most of the water; and completing an appropriate level of oxidation of the framework atoms, inter alia. The calcining atmosphere can be oxidative or relatively inert—if inert, then the atmosphere can typically include nitrogen, helium, and/or argon (e.g., including at least nitrogen); if oxidative, then the atmosphere can typically include oxygen, hydrogen, water, and/or an oxygen-containing gas (such as air, oxygen-enriched air, oxygen-depleted air, and/or including at least oxygen with some relatively inert gas such as mentioned earlier). Exemplary calcining temperatures can include, but are not limited to, from about 400° F. (about 204° C.) to about 1300° F. (about 704° C.), e.g., from about 400° F. (about 204° C.) to about 1200° F. (about 648° C.), from about 400° F. (about 204° C.) to about 1100° F. (about 593° C.), from about 400° F. (about 204° C.) to about 1000° F. (about 538° C.), from about 400° F. (about 204° C.) to about 900° F. (about 482° C.), from about 400° F. (about 204° C.) to about 800° F. (about 426° C.), from about 500° F. (about 260° C.) to about 1300° F. (about 704° C.), from about 500° F. (about 260° C.) to about 1200° F. (about 648° C.), from about 500° F. (about 260° C.) to about 1100° F. (about 593° C.), from about 500° F. (about 260° C.) to about 1000° F. (about 538° C.), from about 500° F. (about 260° C.) to about 900° F. (about 482° C.), from about 500° F. (about 260° C.) to about 800° F. (about 426° C.), from about 600° F. (about 316° C.) to about 1300° F. (about 704° C.), from about 600° F. (about 316° C.) to about 1200° F. (about 648° C.), from about 600° F. (about 316° C.) to about 1100° F. (about 593° C.), from about 600° F. (about 316° C.) to about 1000° F. (about 538° C.), from about 600° F. (about 316° C.) to about 900° F. (about 482° C.), from about 600° F. (about 316° C.) to about 800° F. (about 426° C.), from about 700° F. (about 371° C.) to about 1300° F. (about 704° C.), from about 700° F. (about 371° C.) to about 1200° F. (about 648° C.), from about 700° F. (about 371° C.) to about 1100° F. (about 593° C.), from about 700° F. (about 371° C.) to about 1000° F. (about 538° C.), from about 700° F. (about 371° C.) to about 900° F. (about 482° C.), or from about 700° F. (about 371° C.) to about 800° F. (about 426° C.). Exemplary calcining times can vary with calcining temperature (e.g., the higher the temperature, usually the shorter the time necessary to calcine), but can generally include and are not limited to from about 5 minutes to about 24 hours, from about 5 minutes to about 18 hours, from about 5 minutes to about 12 hours, from about 5 minutes to about 8 hours, from about 5 minutes to about 6 hours, from about 5 minutes to about 4 hours, from about 10 minutes to about 24 hours, from about 10 minutes to about 18 hours, from about 10 minutes to about 12 hours, from about 10 minutes to about 8 hours, from about 10 minutes to about 6 hours, from about 10 minutes to about 4 hours, from about 15 minutes to about 24 hours, from about 15 minutes to about 18 hours, from about 15 minutes to about 12 hours, from about 15 minutes to about 8 hours, from about 15 minutes to about 6 hours, from about 15 minutes to about 4 hours, from about 30 minutes to about 24 hours, from about 30 minutes to about 18 hours, from about 30 minutes to about 12 hours, from about 30 minutes to about 8 hours, from about 30 minutes to about 6 hours, from about 30 minutes to about 4 hours, from about 45 minutes to about 24 hours, from about 45 minutes to about 18 hours, from about 45 minutes to about 12 hours, from about 45 minutes to about 8 hours, from about 45 minutes to about 6 hours, from about 45 minutes to about 4 hours, from about 1 hour to about 24 hours, from about 1 hour to about 18 hours, from about 1 hour to about 12 hours, from about 1 hour to about 8 hours, from about 1 hour to about 6 hours, or from about 1 hour to about 4 hours.

The catalytic crystalline materials useful in the methods according to the invention can include, but are not limited to, a zeolite (e.g., including ZSM-5, ZSM-11, ZSM-12, ZSM-22, ZSM-23, ZSM-48, ZSM-57, boggsite, chabazite, epistilbite, erionite, faujasite, ferrierite, levyne, montesommaite, mordenite, offretite, stilbite, theta-1, zeolite A, zeolite beta, zeolite L, zeolite X, zeolite Y, MCM-22, MCM-41, MCM-56, MCM-68, SAPO-11, SAPO-56, or a combination or intergrowth thereof), a mesoporous material such as MCM-41 and the like, other non-zeolitic crystalline materials, or combinations thereof. It is important to note that, though the instant disclosure focuses on zeolitic catalytic crystalline materials, the method steps can be broadly applied to reinforcing virtually any crystalline material (regardless of zeolitic character and regardless of the types of framework atoms incorporated therein) that can be mixed with a binder and for which selected mechanical properties are desired to be enhanced.

In various embodiments, the catalytic crystalline material can exhibit a ratio of tetravalent atoms to trivalent atoms that indicate a relatively high catalytic activity for the desired catalytic reaction. For instance, the catalytic crystalline material can exhibit a ratio of tetravalent atoms to trivalent atoms of at least 5:1, e.g., at least about 10:1, at least about 15:1, at least about 20:1, at least about 25:1, at least about 30:1, at least about 35:1, at least about 40:1, at least about 50:1, at least about 65:1, at least about 80:1, at least about 90:1, at least about 100:1, at least about 120:1, at least about 135:1, at least about 150:1, at least about 175:1, or at least about 200:1. Additionally in certain embodiments, the catalytic crystalline material can also exhibit a ratio of tetravalent atoms to trivalent atoms of about 2000:1 or less, e.g., about 1000:1 or less, about 750:1 or less, about 600:1 or less, about 500:1 or less, about 400:1 or less, about 300:1 or less, about 250:1 or less, about 200:1 or less, about 150:1 or less, about 125:1 or less, about 110:1 or less, about 100:1 or less, about 90:1 or less, about 80:1 or less, about 65:1 or less, about 50:1 or less, or about 40:1 or less. In a particular embodiment, the catalytic crystalline material can exhibit a ratio of tetravalent atoms to trivalent atoms from about 30:1 to about 150:1, e.g., from about 30:1 to about 65:1 or from about 65:1 to about 150:1.

The methods according to the invention can also advantageously comprise mixing the catalytic crystalline microporous and/or mesoporous material with water, a metal oxide binder, and a reinforcing glass fiber to form an extrudable slurry.

Examples of the metal oxide binder can include, but are not limited to, alumina, silica, magnesia, titania, zirconia, cerium oxide, or combinations thereof. In one embodiment, the metal oxide binder can include at least alumina and/or silica, e.g., can include at least alumina.

In various embodiments, the catalytic crystalline material can be present in an amount from about 50 parts to about 950 parts by weight, e.g., from about 350 parts to about 950 parts by weight, from about 350 parts to about 900 parts, from about 350 parts to about 850 parts, from about 350 parts to about 800 parts, from about 350 parts to about 750 parts, from about 350 parts to about 700 parts, from about 350 parts to about 650 parts, from about 450 parts to about 950 parts, from about 450 parts to about 900 parts, from about 450 parts to about 850 parts, from about 450 parts to about 800 parts, from about 450 parts to about 750 parts, from about 450 parts to about 700 parts, from about 450 parts to about 650 parts, from about 500 parts to about 950 parts, from about 450 parts to about 900 parts, from about 500 parts to about 850 parts, from about 500 parts to about 800 parts, from about 500 parts to about 750 parts, from about 500 parts to about 700 parts, from about 500 parts to about 650 parts, from about 550 parts to about 950 parts, from about 550 parts to about 900 parts, from about 550 parts to about 850 parts, from about 550 parts to about 800 parts, from about 550 parts to about 750 parts, from about 550 parts to about 700 parts, from about 550 parts to about 650 parts, from about 600 parts to about 950 parts, from about 600 parts to about 900 parts, from about 600 parts to about 850 parts, from about 600 parts to about 800 parts, from about 600 parts to about 750 parts, or from about 600 parts to about 700 parts. Additionally or alternately, the metal oxide binder can be present in an amount from about 50 parts to about 950 parts by weight, e.g., from about 50 parts to about 650 parts by weight, from about 50 parts to about 550 parts, from about 50 parts to about 500 parts, from about 50 parts to about 450 parts, from about 50 parts to about 400 parts, from about 100 parts to about 650 parts, from about 100 parts to about 550 parts, from about 100 parts to about 500 parts, from about 100 parts to about 450 parts, from about 100 parts to about 400 parts, from about 150 parts to about 650 parts, from about 150 parts to about 550 parts, from about 150 parts to about 500 parts, from about 150 parts to about 450 parts, from about 150 parts to about 400 parts, from about 200 parts to about 650 parts, from about 200 parts to about 550 parts, from about 200 parts to about 500 parts, from about 200 parts to about 450 parts, from about 200 parts to about 400 parts, from about 250 parts to about 650 parts, from about 250 parts to about 550 parts, from about 250 parts to about 500 parts, from about 250 parts to about 450 parts, from about 250 parts to about 400 parts, from about 300 parts to about 650 parts, from about 300 parts to about 550 parts, from about 300 parts to about 500 parts, from about 300 parts to about 450 parts, from about 300 parts to about 400 parts, from about 350 parts to about 650 parts, from about 350 parts to about 550 parts, from about 350 parts to about 500 parts, from about 350 parts to about 450 parts, from about 400 parts to about 650 parts, from about 400 parts to about 550 parts, or from about 400 parts to about 500 parts. In most embodiments, it can be desirable for the combination of catalytic crystalline material and metal oxide binder to constitute about 1000 parts by weight together.

In many embodiments, the reinforcing glass fiber can exhibit a diameter of at least 2 microns, e.g., of at least 5 microns, of at least 10 microns, of at least 15 microns, or of at least 20 microns. Additionally or alternately, the reinforcing glass fiber can exhibit a diameter of not more than 200 microns, e.g., not more than 100 microns, not more than 75 microns, not more than 50 microns, not more than 40 microns, not more than 30 microns, not more than 25 microns, not more than 20 microns, or not more than 15 microns. Further additionally or alternately, the reinforcing glass fiber can exhibit a diameter from 5 microns to 100 microns, e.g., from 5 microns to 50 microns, from 5 microns to 30 microns, from 5 microns to 20 microns, from 10 microns to 100 microns, from 10 microns to 50 microns, from 10 microns to 30 microns, from 10 microns to 20 microns.

In many embodiments, the reinforcing glass fiber can additionally or alternately exhibit a length-to-diameter ratio of at least 300:1, e.g., at least 400:1, at least 500:1, at least 600:1, at least 700:1, at least 750:1, at least 800:1, at least 850:1, at least 900:1, at least 950:1, or at least 1000:1. Further additionally or alternately, the reinforcing glass fiber can exhibit a length-to-diameter ratio of not more than 10000:1, e.g., not more than 5000:1, not more than 4000:1, not more than 3000:1, not more than 2500:1, not more than 2000:1, not more than 1750:1, not more than 1500:1, or not more than 1250:1. Still further additionally or alternately, the reinforcing glass fiber can exhibit a length-to-diameter ratio from 300:1 to 3000:1, e.g., from 300:1 to 2000:1, from 300:1 to 1500:1, from 300:1 to 1250:1, from 500:1 to 3000:1, from 500:1 to 2000:1, from 500:1 to 1500:1, from 500:1 to 1250:1, from 750:1 to 3000:1, from 750:1 to 2000:1, from 750:1 to 1500:1, from 750:1 to 1250:1, from 850:1 to 3000:1, from 850:1 to 2000:1, from 850:1 to 1500:1, or from 850:1 to 1250:1.

In many embodiments, the reinforcing glass fiber can further additionally or alternately be present in an amount from about 1 part to about 100 parts, based on about 1000 parts combined of catalytic crystalline material and metal oxide binder, e.g., from about 1 part to about 75 parts, from about 1 part to about 50 parts, from about 1 part to about 40 parts, from about 1 part to about 30 parts, from about 5 parts to about 100 parts, from about 5 parts to about 75 parts, from about 5 parts to about 50 parts, from about 5 parts to about 40 parts, from about 5 parts to about 30 parts, from about 8 parts to about 100 parts, from about 8 parts to about 75 parts, from about 8 parts to about 50 parts, from about 8 parts to about 40 parts, from about 8 parts to about 30 parts, from about 10 parts to about 100 parts, from about 10 parts to about 75 parts, from about 10 parts to about 50 parts, from about 10 parts to about 40 parts, or from about 10 parts to about 30 parts.

The methods according to the invention can also advantageously comprise extruding the extrudable slurry under conditions sufficient to orient the reinforcing glass fiber and to form a reinforced catalytic microporous and/or mesoporous bound extrudate.

The methods according to the invention can also advantageously comprise calcining the reinforced catalytic microporous and/or mesoporous bound extrudate at a temperature and for a time sufficient to form a calcined reinforced catalytic microporous and/or mesoporous bound catalyst.

Appropriate calcining conditions can advantageously include those that substantively accomplish one or more of the following goals: removing and/or decomposing any remaining SDA; removing and/or decomposing any residual organic matter; driving off most of the water; and completing an appropriate level of oxidation of the framework atoms, inter alia. The calcining atmosphere can be either oxidative or relatively inert—if inert, then the atmosphere can typically include nitrogen, helium, and/or argon (e.g., including at least nitrogen); if oxidative, then the atmosphere can typically include oxygen, hydrogen, water, and/or an oxygen-containing gas (such as air, oxygen-enriched air, oxygen-depleted air, and/or including at least oxygen with some relatively inert gas such as mentioned earlier). Exemplary calcining temperatures can include, but are not limited to, from about 400° F. (about 204° C.) to about 1300° F. (about 704° C.), e.g., from about 400° F. (about 204° C.) to about 1200° F. (about 648° C.), from about 400° F. (about 204° C.) to about 1100° F. (about 593° C.), from about 400° F. (about 204° C.) to about 1000° F. (about 538° C.), from about 400° F. (about 204° C.) to about 900° F. (about 482° C.), from about 400° F. (about 204° C.) to about 800° F. (about 426° C.), from about 500° F. (about 260° C.) to about 1300° F. (about 704° C.), from about 500° F. (about 260° C.) to about 1200° F. (about 648° C.), from about 500° F. (about 260° C.) to about 1100° F. (about 593° C.), from about 500° F. (about 260° C.) to about 1000° F. (about 538° C.), from about 500° F. (about 260° C.) to about 900° F. (about 482° C.), from about 500° F. (about 260° C.) to about 800° F. (about 426° C.), from about 600° F. (about 316° C.) to about 1300° F. (about 704° C.), from about 600° F. (about 316° C.) to about 1200° F. (about 648° C.), from about 600° F. (about 316° C.) to about 1100° F. (about 593° C.), from about 600° F. (about 316° C.) to about 1000° F. (about 538° C.), from about 600° F. (about 316° C.) to about 900° F. (about 482° C.), from about 600° F. (about 316° C.) to about 800° F. (about 426° C.), from about 700° F. (about 371° C.) to about 1300° F. (about 704° C.), from about 700° F. (about 371° C.) to about 1200° F. (about 648° C.), from about 700° F. (about 371° C.) to about 1100° F. (about 593° C.), from about 700° F. (about 371° C.) to about 1000° F. (about 538° C.), from about 700° F. (about 371° C.) to about 900° F. (about 482° C.), or from about 700° F. (about 371° C.) to about 800° F. (about 426° C.). Exemplary calcining times can vary with calcining temperature (e.g., the higher the temperature, usually the shorter the time necessary to calcine), but can generally include and are not limited to from about 5 minutes to about 24 hours, from about 5 minutes to about 18 hours, from about 5 minutes to about 12 hours, from about 5 minutes to about 8 hours, from about 5 minutes to about 6 hours, from about 5 minutes to about 4 hours, from about 10 minutes to about 24 hours, from about 10 minutes to about 18 hours, from about 10 minutes to about 12 hours, from about 10 minutes to about 8 hours, from about 10 minutes to about 6 hours, from about 10 minutes to about 4 hours, from about 15 minutes to about 24 hours, from about 15 minutes to about 18 hours, from about 15 minutes to about 12 hours, from about 15 minutes to about 8 hours, from about 15 minutes to about 6 hours, from about 15 minutes to about 4 hours, from about 30 minutes to about 24 hours, from about 30 minutes to about 18 hours, from about 30 minutes to about 12 hours, from about 30 minutes to about 8 hours, from about 30 minutes to about 6 hours, from about 30 minutes to about 4 hours, from about 45 minutes to about 24 hours, from about 45 minutes to about 18 hours, from about 45 minutes to about 12 hours, from about 45 minutes to about 8 hours, from about 45 minutes to about 6 hours, from about 45 minutes to about 4 hours, from about 1 hour to about 24 hours, from about 1 hour to about 18 hours, from about 1 hour to about 12 hours, from about 1 hour to about 8 hours, from about 1 hour to about 6 hours, or from about 1 hour to about 4 hours.

In some embodiments, the method according to the invention can further comprise the step of exposing the calcined reinforced bound catalyst to steam, e.g., at a temperature from about 500° F. (about 260° C.) to about 1000° F. (about 538° C.), from about 600° F. (about 316° C.) to about 1000° F. (about 538° C.), from about 500° F. (about 260° C.) to about 900° F. (about 482° C.), or from about 600° F. (about 316° C.) to about 900° F. (about 482° C.), and for a period of time from about 5 minutes to about 24 hours, from about 5 minutes to about 18 hours, from about 5 minutes to about 12 hours, from about 5 minutes to about 8 hours, from about 5 minutes to about 6 hours, from about 5 minutes to about 4 hours, from about 10 minutes to about 24 hours, from about 10 minutes to about 18 hours, from about 10 minutes to about 12 hours, from about 10 minutes to about 8 hours, from about 10 minutes to about 6 hours, from about 10 minutes to about 4 hours, from about 15 minutes to about 24 hours, from about 15 minutes to about 18 hours, from about 15 minutes to about 12 hours, from about 15 minutes to about 8 hours, from about 15 minutes to about 6 hours, from about 15 minutes to about 4 hours, from about 30 minutes to about 24 hours, from about 30 minutes to about 18 hours, from about 30 minutes to about 12 hours, from about 30 minutes to about 8 hours, from about 30 minutes to about 6 hours, from about 30 minutes to about 4 hours, from about 45 minutes to about 24 hours, from about 45 minutes to about 18 hours, from about 45 minutes to about 12 hours, from about 45 minutes to about 8 hours, from about 45 minutes to about 6 hours, from about 45 minutes to about 4 hours, from about 1 hour to about 24 hours, from about 1 hour to about 18 hours, from about 1 hour to about 12 hours, from about 1 hour to about 8 hours, from about 1 hour to about 6 hours, or from about 1 hour to about 4 hours, to form a steamed reinforced catalytic microporous and/or mesoporous bound catalyst. Though steaming is not necessarily an activation step per se, without being bound by theory, it is believed that a steaming step may increase certain types of catalytic activity for calcined catalysts. Further, while the process step of steaming is described herein, it is contemplated that any necessary step to appropriately activate the catalyst can additionally or alternately be performed, typically (if present) after the calcining of the bound catalyst.

In a preferred embodiment according to the invention, the reinforced catalytic microporous and/or mesoporous bound extrudate, before calcining, can exhibit a reinforced length-to-diameter ratio after a 3×6' drop test, and a catalytic microporous and/or mesoporous bound extrudate, before calcining, identical to its reinforced version except for the absence of any reinforcing glass fiber, can exhibit an unreinforced length-to-diameter ratio after a 3×6' drop test, such that the reinforced length-to-diameter ratio after the drop test can advantageously be from about 10% to about 75% greater than the unreinforced length-to-diameter ratio after the drop test.

In various embodiments according to the invention, the steamed reinforced catalytic microporous and/or mesoporous bound catalyst can exhibit one or more of the following properties: an alpha value of at least about 70, e.g., at least about 90; a BET surface area of at least about 250 m$^2$/g, and optionally less than about 750 m$^2$/g; a hexane sorption of less than about 40 mg per gram of catalyst, e.g., of about 30 mg per gram of catalyst or less; and a crush strength of at least about 90 lbs/in (about 15.9 N/mm), e.g., from about 90 lbs-force/in (about 15.9 N/mm) to about 120 lbs-force/in (about 21.3 N/mm).

Additionally or alternately, in certain embodiments according to the invention, one or more of the following is satisfied: the reinforced catalytic microporous and/or mesoporous bound extrudate, before calcining, exhibits an as-extruded length-to-diameter ratio of at least 6.0; the reinforced length-to-diameter ratio after a 3×6' drop test is from about 15% to about 45% greater than the unreinforced length-to-diameter ratio after a 3×6' drop test; the calcined reinforced catalytic microporous and/or mesoporous bound catalyst exhibits a BET surface area of at least about 250 m$^2$/g, and optionally less than about 750 m$^2$/g; the calcined reinforced catalytic microporous and/or mesoporous bound catalyst exhibits an alpha value of at least about 60, e.g., at least about 90; the calcined reinforced catalytic microporous and/or mesoporous bound catalyst exhibits a crush strength of at least about 90 lbs/in (about 15.9 N/mm), e.g., from about 90 lbs-force/in (about 15.9 N/mm) to about 120 lbs-force/in (about 21.3 N/mm); and the reinforced catalytic microporous and/or mesoporous bound extrudate, before calcining, exhibits a second reinforced length-to-diameter ratio after a 6×6' drop test, and a catalytic microporous and/or mesoporous bound extrudate, before calcining, identical to its reinforced version except for the absence of any reinforcing glass fiber, exhibits an second unreinforced length-to-diameter ratio after a 6×6' drop test, such that the second reinforced length-to-diameter ratio after the drop test is from about 10% to about 75% (e.g., from about 10% to about 65%) greater than the second unreinforced length-to-diameter ratio after the drop test.

In some embodiments, merely forming a reinforced bound catalyst may not sufficient, particularly if further increased catalytic activity is desired. In such embodiments where additional catalytic activity is desired, the methods according to the invention can optionally further comprise depositing a catalytically active metal component on and/or in the (micro- and/or meso-) pores of the calcined reinforced bound catalyst. The nature of the catalytically active metal to be deposited can depend heavily on the particular catalytic activity desired to be enhanced. In one embodiment, the catalytically active metal can include, but is not necessarily limited to, one or more elements from Groups 6 and 8-10 of the Periodic Table of Elements (e.g., comprising Pt and/or Pd, or comprising either or both of Co and Ni and either or both of Mo and W).

The crystalline molecular sieve produced by the present process can be used to catalyze a wide variety of organic compound conversion processes including many of present commercial/industrial importance. Examples of chemical conversion processes effectively catalyzed by the crystalline material of this invention, by itself or in combination with one or more other catalytically active substances including other crystalline catalysts, can include those requiring a catalyst with acid activity. Specific examples can include, but are not limited to:

(a) alkylation of aromatics with short chain ($C_2$-$C_6$) olefins, e.g., alkylation of ethylene or propylene with benzene to produce ethylbenzene or cumene respectively, in the gas or liquid phase, with reaction conditions optionally including one or more of a temperature from about 10° C. to about 250° C., a pressure from about 0 psig to about 500 psig (about 3.5 MPag), a total weight hourly space velocity (WHSV) from about 0.5 hr$^{-1}$ to about 100 hr$^{-1}$, and an aromatic/olefin mole ratio from about 0.1 to about 50;

(b) alkylation of aromatics with long chain ($C_{10}$-$C_{20}$) olefins, in the gas or liquid phase, with reaction conditions optionally including one or more of a temperature from about 250° C. to about 500° C., a pressure from about 0 psig to 500 psig (about 3.5 MPag), a total WHSV from about 0.5 hr$^{-1}$ to about 50 hr$^{-1}$, and an aromatic/olefin mole ratio from about 1 to about 50;

(c) transalkylation of aromatics, in gas or liquid phase, e.g., transalkylation of polyethylbenzenes and/or polyisopropylbenzenes with benzene to produce ethylbenzene and/or cumene respectively, with reaction conditions optionally including one or more of a temperature from about 100° C. to about 500° C., a pressure from about 1 psig (about 7 kPag)

to about 500 psig (about 3.5 MPag), and a WHSV from about 1 hr$^{-1}$ to about 10,000 hr$^{-1}$;

(d) disproportionation of alkylaromatics, e.g., disproportionation of toluene to produce xylenes, with reaction conditions optionally including one or more of a temperature from about 200° C. to about 760° C., a pressure from about 1 atm (about 0 psig) to about 60 atm (about 5.9 MPag), a WHSV from about 0.1 hr$^{-1}$ to about 20 hr$^{-1}$, and a hydrogen/hydrocarbon mole ratio from 0 (no added hydrogen) to about 50;

(e) dealkylation of alkylaromatics, e.g., deethylation of ethylbenzene, with reaction conditions optionally including one or more of a temperature from about 200° C. to about 760° C., a pressure from about 1 atm (about 0 psig) to about 60 atm (about 5.9 MPag), a WHSV from about 0.1 hr$^{-1}$ to about 20 hr$^{-1}$, and a hydrogen to hydrocarbon mole ratio from 0 (no added hydrogen) to about 50;

(f) isomerization of alkylaromatics, such as xylenes, with reaction conditions optionally including one or more of a temperature from about 200° C. to about 540° C., a pressure from about 100 kPaa to about 7 MPaa, a WHSV from about 0.1 hr$^{-1}$ to about 50 hr$^{-1}$, and a hydrogen/hydrocarbon mole ratio from 0 (no added hydrogen) to about 10;

(g) reaction of paraffins with aromatics, e.g., to form alkylaromatics and light gases, with reaction conditions optionally including one or more of a temperature from about 260° C. to about 375° C., a pressure from about 0 psig to about 1000 psig (about 6.9 MPag), a WHSV from about 0.5 hr$^{-1}$ to about 10 hr$^{-1}$, and a hydrogen/hydrocarbon mole ratio from 0 (no added hydrogen) to about 10;

(h) paraffin isomerization to provide branched paraffins with reaction conditions optionally including one or more of a temperature from about 200° C. to about 315° C., a pressure from about 100 psig (about 690 kPag) to about 1000 psig (about 6.9 MPag), a WHSV from about 0.5 hr$^{-1}$ to about 10 hr$^{-1}$, and a hydrogen to hydrocarbon mole ratio from about 0.5 to about 10;

(i) alkylation of iso-paraffins, such as isobutane, with olefins, with reaction conditions optionally including one or more of a temperature from about −20° C. to about 350° C., a pressure from about 0 psig to about 700 psig (about 4.9 MPag), and a total olefin WHSV from about 0.02 hr$^{-1}$ to about 10 hr$^{-1}$;

(j) dewaxing of paraffinic feeds with reaction conditions optionally including one or more of a temperature from about 200° C. to about 450° C., a pressure from about 0 psig to about 1000 psig (about 6.9 MPag), a WHSV from about 0.2 hr$^{-1}$ to about 10 hr$^{-1}$, and a hydrogen/hydrocarbon mole ratio from about 0.5 to about 10;

(k) cracking of hydrocarbons with reaction conditions optionally including one or more of a temperature from about 300° C. to about 700° C., a pressure from about 0.1 atm (about 10 kPag) to about 30 atm (about 3 MPag), and a WHSV from about 0.1 hr$^{-1}$ to about 20 hr$^{-1}$;

(l) isomerization of olefins with reaction conditions optionally including one or more of a temperature from about 250° C. to about 750° C., an olefin partial pressure from about 30 kPa to about 300 kPa, and a WHSV from about 0.5 hr$^{-1}$ to about 500 hr$^{-1}$; and (m) a hydrocarbon trap (e.g., pre-catalytic converter adsorbent) for cold start emissions in motor vehicles.

Additionally or alternately, the invention can include one or more of the following embodiments.

Embodiment 1

A method of making a reinforced catalytic microporous and/or mesoporous bound composition comprising the steps of: providing a catalytic crystalline microporous and/or mesoporous material formed from processing at least a source of tetravalent atoms, Y, and a source of trivalent atoms, X, under sufficient crystallization conditions, and optionally calcined under sufficient conditions; mixing the catalytic crystalline microporous and/or mesoporous material with water, a metal oxide binder comprising alumina, silica, magnesia, titania, zirconia, or a combination thereof, and a reinforcing glass fiber having a diameter from 5 microns to 100 microns and a length-to-diameter ratio from 500:1 to 3000:1 to form an extrudable composition (slurry, paste, etc.), wherein the reinforcing glass fiber is present in an amount from about 1 part to about 50 parts, based on about 1000 parts combined of catalytic crystalline material and metal oxide binder; extruding the extrudable slurry under conditions sufficient to orient the reinforcing glass fiber and to form the reinforced catalytic microporous and/or mesoporous bound extrudate; and calcining the reinforced catalytic microporous and/or mesoporous bound extrudate at a temperature and for a time sufficient to form a calcined reinforced catalytic microporous and/or mesoporous bound catalyst, wherein the reinforced catalytic microporous and/or mesoporous bound extrudate, before calcining, exhibits a reinforced length-to-diameter ratio after a 3×6' drop test, and wherein a catalytic microporous and/or mesoporous bound extrudate, before calcining, identical to its reinforced version except for the absence of any reinforcing glass fiber, exhibits an unreinforced length-to-diameter ratio after a 3×6' drop test, such that the reinforced length-to-diameter ratio after the drop test is from about 10% to about 75% greater than the unreinforced length-to-diameter ratio after the drop test.

Embodiment 2

The method of embodiment 1, wherein the tetravalent atoms comprise Si and wherein the trivalent atoms comprise Al.

Embodiment 3

The method of embodiment 1 or embodiment 2, wherein the catalytic crystalline microporous and/or mesoporous material comprises a zeolite, e.g., including ZSM-5, ZSM-12, ZSM-22, ZSM-23, ZSM-48, ZSM-57, boggsite, chabazite, epistilbite, erionite, faujasite, ferrierite, levyne, montesommaite, mordenite, offretite, stilbite, theta-1, zeolite A, zeolite beta, zeolite L, zeolite X, zeolite Y, MCM-22, MCM-56, MCM-68, SAPO-11, SAPO-56, or a combination or intergrowth thereof.

Embodiment 4

The method of any one of the previous embodiments, wherein the catalytic crystalline microporous and/or mesoporous material exhibits a ratio of tetravalent atoms to trivalent atoms from about 30:1 to about 150:1.

Embodiment 5

The method of any one of the previous embodiments, wherein the metal oxide binder comprises alumina and/or silica.

Embodiment 6

The method of any one of the previous embodiments, wherein the reinforcing glass fiber has a diameter from 5 microns to 30 microns and a length-to-diameter ratio from 500:1 to 1500:1.

Embodiment 7

The method of any one of the previous embodiments, wherein the reinforcing glass fiber is present in an amount from about 10 parts to about 30 parts, based on about 1000 parts combined of catalytic crystalline material and metal oxide binder.

Embodiment 8

The method of any one of the previous embodiments, wherein the catalytic crystalline material is present in an amount from about 500 parts to about 900 parts, and wherein the metal oxide binder is present in an amount from about 100 parts to about 500 parts, such that the combination of catalytic crystalline material and metal oxide binder comprises about 1000 parts.

Embodiment 9

The method of any one of the previous embodiments, further comprising the step of exposing the calcined reinforced catalytic microporous and/or mesoporous bound catalyst to steam at a temperature from about 500° F. (about 260° C.) to about 1000° F. (about 538° C.) for a period of time from about 5 minutes to about 24 hours to form a steamed reinforced catalytic microporous and/or mesoporous bound catalyst.

Embodiment 10

The method of embodiment 10, wherein the steamed reinforced catalytic microporous and/or mesoporous bound catalyst exhibits one or more of the following properties: an alpha value of at least about 70, e.g., at least about 90; a BET surface area of at least about 250 m²/g, and optionally less than about 750 m²/g; a hexane sorption of less than about 40 mg per gram of catalyst, e.g., of about 30 mg per gram of catalyst or less; and a crush strength of at least about 90 lbs/in (about 15.9 N/mm), e.g., from about 90 lbs/in (about 15.9 N/mm) to about 120 lbs/in (about 21.3 N/mm).

Embodiment 11

The method of any one of the previous embodiments, wherein one or more of the following is satisfied: the reinforced catalytic microporous and/or mesoporous bound extrudate, before calcining, exhibits an as-extruded length-to-diameter ratio of at least 6.0; the reinforced length-to-diameter ratio after a 3×6' drop test is from about 15% to about 45% greater than the unreinforced length-to-diameter ratio after a 3×6' drop test; the calcined reinforced catalytic microporous and/or mesoporous bound catalyst exhibits a BET surface area of at least about 250 m²/g, and optionally less than about 750 m²/g; the calcined reinforced catalytic microporous and/or mesoporous bound catalyst exhibits an alpha value of at least about 60, e.g., at least about 90; the calcined reinforced catalytic microporous and/or mesoporous bound catalyst exhibits a crush strength of at least about 90 lbs/in (about 15.9 N/mm), e.g., from about 90 lbs/in (about 15.9 N/mm) to about 120 lbs/in (about 21.3 N/mm); and the reinforced catalytic microporous and/or mesoporous bound extrudate, before calcining, exhibits a second reinforced length-to-diameter ratio after a 6×6' drop test, and a catalytic microporous and/or mesoporous bound extrudate, before calcining, identical to its reinforced version except for the absence of any reinforcing glass fiber, exhibits an second unreinforced length-to-diameter ratio after a 6×6' drop test, such that the second reinforced length-to-diameter ratio after the drop test is from about 10% to about 75% (e.g., from about 10% to about 65%) greater than the second unreinforced length-to-diameter ratio after the drop test.

Embodiment 12

The method of any one of the previous embodiments, further comprising depositing a catalytically active metal component comprising one or more elements from Groups 6 and 8-10 of the Periodic Table of Elements (e.g., comprising Pt and/or Pd, or comprising either or both of Co and Ni and either or both of Mo and W) on and/or in pores of the calcined reinforced catalytic microporous and/or mesoporous bound catalyst.

EXAMPLES

Preparation of Glass Fiber for Reinforcement of Extrudates in Examples

First, the weave of plain 1½×1/16" E-glass insulation tape (commercially available from Atlantech Distribution) was manually undone (see FIG. 1A). The E-glass fibers were believed to be coated with a layer of polymer. Then, several strands of E-glass fibers were bundled together—these strands measured approximately 10"-12" in length. The bundle of E-glass fibers was cut into approximately ⅛"-¼" segments and then collected in a jar. The appropriate weight of E-glass fibers for ~1 wt % loading and ~3 wt % loading (i.e., for about 1 part of E-glass fibers per about 100 parts combined of catalytic crystalline material and metal oxide binder, and for about 3 parts of E-glass fibers per about 100 parts combined of catalytic crystalline material and metal oxide binder, respectively) was determined and weighed out. In certain preparations, the chopped fibers were subject to a calcining step (at about 600° C. for about 6 hours in air), e.g., to substantially remove the polymer coating—after calcination, the resulting uncoated E-glass fibers appeared to exhibit ~2.5% weight loss. In other preparations, the chopped fibers were used as received, uncalcined and with the polymer coating intact.

A calculated amount of deionized water was added to the respective E-glass fiber weight in a ~2 L beaker (e.g., sufficient to attain roughly a 45-48% solids mixture in the muller, along with the remaining ingredients). The combination of E-glass fibers and deionized water (which appeared like wet hair clumps) was mixed in a HSM-100™ high shear mixer (commercially available from Ross-LCI) for approximately 10 minutes under relatively high shear conditions (e.g., at about 800 rpm for about 10 minutes with a high shear blade). Thereafter, the wet dispersed E-glass fibers were ready to be added to the mulling mixture.

Property/Characterization Testing Methods Used in Examples.

Alpha Value is an approximate indication of the catalytic cracking activity of the catalyst compared to a standard catalyst, and it gives the relative rate constant (rate of normal hexane conversion per volume of catalyst per unit time). It is based on the activity of silica-alumina cracking catalyst taken as an Alpha of 1 (Rate Constant≈0.016 sec$^{-1}$). The test for Alpha Value is described in U.S. Pat. No. 3,354,078 and in the Journal of Catalysis at 4, 527 (1965); 6, 278 (1966); and 61, 395 (1980), each incorporated herein by reference as to the relevant description. The experimental conditions of the Alpha Value test used herein include a constant temperature of about 538° C. and a variable flow rate as described in detail in the Journal of Catalysis, v. 61, p. 395. Higher alpha values tend to correspond with a relatively more active catalyst.

A bound catalyst material can be characterized by comparing the micropore surface area of the catalyst with the total surface area of the catalyst material. These surface areas can be calculated based on analysis of nitrogen porosimetry ($N_2$ at approximately 77° K) data using a TriStar™ 3000 Surface Area Analyzer (from Micromeretics) using the BET method for surface area measurement. Previous work has shown that the amount of zeolite content versus binder content in catalyst can be determined from BET measurements (see, e.g., Johnson, M. F. L., *Jour. Catal.*, (1978) 52, 425). However, these analyses assume that the external (mesoporous) surface area, or the non-micropore surface area, originates wholly from the binder, which may or may not apply in the instant bound catalyst materials described herein. The micropore surface area of a composition refers to the amount of catalyst surface area provided due to the molecular sieve and/or the micropores in the catalyst in the BET measurements. The total surface area represents the micropore surface plus the external (mesoporous) surface area, e.g. of the bound catalyst material.

N-hexane sorption measurements were made on a computer controlled (Vista/Fortran) TA Instruments™ Q-5000 Thermogravimetric analyzer (TGA). Isotherms were measured at ~90° C., and adsorption values (measured in miligrams of n-hexane sorbed per gram of sample) were conducted at ~75 torr (~10 kPa) partial pressure n-hexane.

Crush strength tests were done on a Vankel VK200™ Tablet Hardness Tester using a ⅛" anvil according to the following procedure. About 150-200 riffled particles (minimum) were placed in a porcelain dish or Pyrex™ beaker, and then into a refractory-type muffle oven heated to about 1000° F. (about 538° C.) for ~1 hour. About 50 particles were removed from the oven just prior to the analysis, with the remaining sample left in the oven for optional further use after fracturing the first 25 particles. If particles needed to sit for a while before being analyzed, then they were placed under a blanket of flowing dry nitrogen to discourage moisture uptake/influence. Each of at least 25 single particles were then isolated and individually analyzed in the Vankel Tester. Sample results represent a statistical average of all the analyzed samples.

Ratios of length-to-diameter (L/D) of particles were achieved through the use of the ALIAS (Advanced Laboratory Imaging and Analysis System), which utilizes an optical scanner to determine individual particle size on a distribution of particles. The following procedure is used to attain L/D ratio results with ALIAS. An inkjet transparency is placed on the scanner glass (slick side down, rough side up), onto which the desired particles (about 150-200 at minimum) are scattered, relatively uniformly and ensuring that no particles are touching each other. If necessary, the transparency can be jiggled to spread out the particles and/or a pair of tweezers can be used to separate and/or relocate particles on the transparency. Upon scanning, the ALIAS software will determine if touching particles are detected—this determination is checked visually. If there are touching particles, they can be removed from the distribution, or the particles can be manually separated and the scan re-run. A quality control standard (re-calibrated daily) utilizes ~42 polyethylene, cylindrically-shaped particles of varying known (measured) lengths and diameters. L/D ratio results represent an average of validated particles scanned.

Drop testing herein was conducted primarily on green extrudates, which were dried (in this case at about 121° C.) but not calcined. Because drop tested samples were analyzed for L/D ratio, enough samples were used to satisfy the procedure for L/D ratio determination using ALIAS, and thus results represent an average of the samples tested. Drop tests were conducted by taking the green extrudate samples immediately out of the drying process and pouring them into an enclosed 6' tall by 6" diameter Lexan™ column/pipe onto a sheet of transparency paper. 3×6' drop tests included where three drops were made before subsequent L/D ratio testing—an initial drop of the green extrudate, followed by two additional drops for the dropped extrudate material collected on the transparency paper. Similarly, 6×6' drop tests included where six drops were made before subsequent L/D ratio testing—an initial drop of the green extrudate, followed by five additional drops for the dropped extrudate material collected on the transparency paper.

Comparative Example 1—Unreinforced ZSM-48 Catalyst Bound with Alumina

About 65 parts of high activity (~70/1 Si/$Al_2$ ratio) ZSM-48 zeolite crystal (on the basis of the weight of the as-calcined material treated at ~538° C. for ~4-6 hours) were mixed with about 35 parts of Versal™ 300 pseudoboehmite alumina binder (commercially available from UOP of Des Plaines, Iowa, USA; on the basis of the weight of the as-calcined material treated at ~538° C. for ~4-6 hours) in a Lancaster LWD muller (commercially available from Kercher Industries). Sufficient water was added to produce an extrudable paste on a ~2" Bonnot™ extruder (e.g., forming a paste having roughly 45-48% solids; in this case, ~46% solids). The mixture of ZSM-48, pseudoboehmite alumina, and water was extruded into ~1/20" quadralobes and then dried in a hotpack oven at about 121° C. overnight (for about 8-16 hours). The dried extrudate was calcined in nitrogen at about 538° C., e.g., to remove and/or mostly or completely decompose the organic template. The $N_2$ calcined extrudate was then humidified with saturated air and exchanged with ~1N ammonium nitrate to remove alkali atoms such as sodium (spec≈<500 ppm Na). After ammonium nitrate exchange, the extrudate was washed with deionized water, e.g., to remove residual nitrate ions prior to drying. The ammonium exchanged extrudate was then dried at about 121° C. overnight (again, for about 8-16 hours) and calcined in air at about 538° C. for about 4-6 hours. After drying but before air calcination, the resulting dried catalyst was labeled Sample 1A. After air calcination, the resulting H-form catalyst was labeled Sample 1B. The properties of, and the results of specific testing on, each of these Samples are shown in Tables 1-2 below.

Example 2—ZSM-48 Alumina-Bound Catalyst, Reinforced with 1% Glass Fibers

Figure 2A:
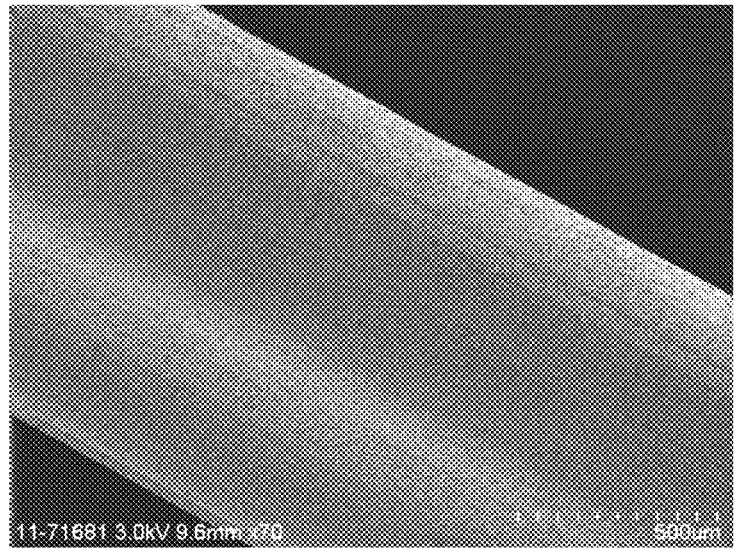
FIGS. 2A-2B show SEM images of a side view and a cross-section, respectively, of a quadrulobal reinforced extrudate of the invention, made according to Example 2.
Figure 2B:
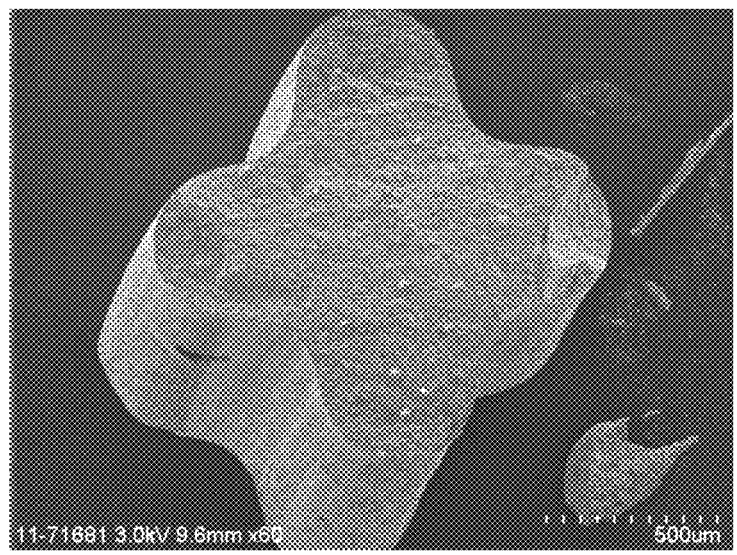

About 65 parts of high activity (~70/1 Si/$Al_2$ ratio) ZSM-48 zeolite crystal (on the basis of the weight of the as-calcined material treated at ~538° C. for ~4-6 hours) were mixed with about 35 parts of Versal™ 300 pseudoboehmite alumina binder (commercially available from UOP of Des Plaines, Iowa, USA; on the basis of the weight of the as-calcined material treated at ~538° C. for ~4-6 hours) in a muller. Sufficient water containing about 1 part uncalcined (polymer-coated) E-glass fibers (relative to the ~100 parts of combined catalytic crystalline material and metal oxide binder) was added to produce an extrudable paste on a ~2" Bonnot™ extruder. The mixture of ZSM-48, pseudoboehmite alumina, E-glass fibers, and water was extruded into ~1/20" quadralobes and then dried in a hotpack oven at about 121° C. overnight (for about 8-16 hours). Scanning electron microscope images of the resulting dried extrudates are shown in FIGS. 2A-2B.

The dried extrudate was calcined in nitrogen at about 538° C., e.g., to remove and/or mostly or completely decompose the organic template. The $N_2$ calcined extrudate was then humidified with saturated air and exchanged with ~1N ammonium nitrate to remove alkali atoms such as sodium (spec≈<500 ppm Na). After ammonium nitrate exchange, the extrudate was washed with deionized water, e.g., to remove residual nitrate ions prior to drying. The ammonium exchanged extrudate was then dried at about 121° C. overnight (again, for about 8-16 hours) and calcined in air at about 538° C. for about 4-6 hours. After drying but before air calcination, the resulting dried catalyst was labeled Sample 2A. After air calcination, the resulting H-form catalyst was labeled Sample 2B. After air calcination, the resulting H-form catalyst was alternately treated with steam at about 700° F. (about 371° C.) for about 4 hours (the resulting steamed H-form catalyst was labeled as Sample 2C) or treated with steam at about 800° F. (about 427° C.) for about 4 hours (the resulting steamed H-form catalyst was labeled as Sample 2D).

The H-form extrudates (Samples 2B, 2C, and 2D) were analyzed to determine alpha value, BET surface area, hexane sorption, crush strength, and L/D based on a 3×6' drop test and on a 6×6' drop test. The properties of, and the results of specific testing on, each of the enumerated samples are shown in Tables 1-2 below.

Example 3—ZSM-48 Alumina-Bound Catalyst, Reinforced with 3% Glass Fibers

Figure 3A:
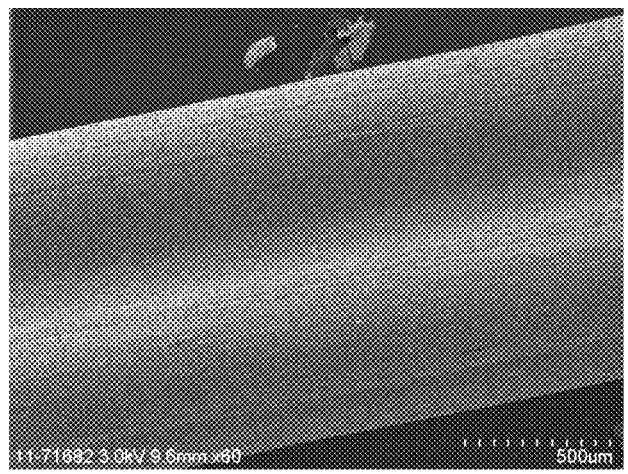
FIGS. 3A-3C show SEM images of a side view and two cross-sections, respectively, at increasing magnifications, of a quadrulobal reinforced extrudate of the invention, made according to Example 3.
Figure 3B:
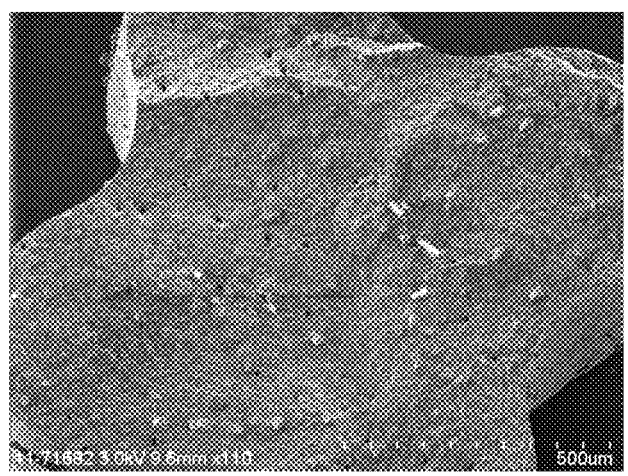
Figure 3C:
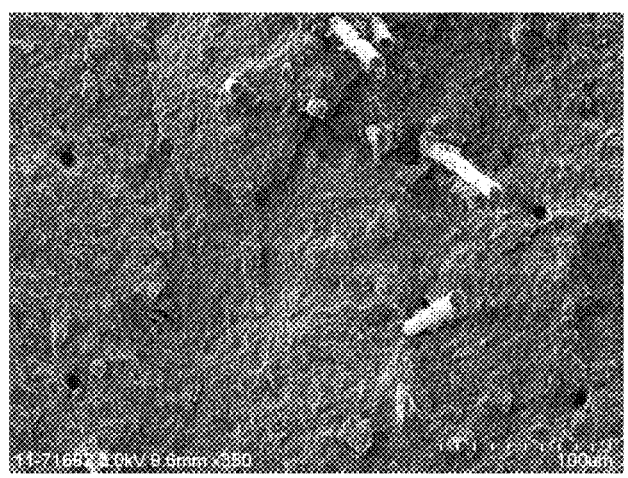

About 65 parts of high activity (~70/1 $Si/Al_2$ ratio) ZSM-48 zeolite crystal (on the basis of the weight of the as-calcined material treated at ~538° C. for ~4-6 hours) were mixed with about 35 parts of Versal™ 300 pseudoboehmite alumina binder (commercially available from UOP of Des Plaines, Iowa, USA; on the basis of the weight of the as-calcined material treated at ~538° C. for ~4-6 hours) in a muller. Sufficient water containing about 3 parts uncalcined (polymer-coated) E-glass fibers (relative to the ~100 parts of combined catalytic crystalline material and metal oxide binder) was added to produce an extrudable paste on a ~2" Bonnot™ extruder. The mixture of ZSM-48, pseudoboehmite alumina, E-glass fibers, and water was extruded into ~1/20" quadralobes and then dried in a hotpack oven at about 121° C. overnight (for about 8-16 hours). Scanning electron microscope images of the resulting dried extrudates are shown in FIGS. 3A-3C.

The dried extrudate was calcined in nitrogen at about 538° C., e.g., to remove and/or mostly or completely decompose the organic template. The $N_2$ calcined extrudate was then humidified with saturated air and exchanged with ~1N ammonium nitrate to remove alkali atoms such as sodium (spec≈<500 ppm Na). After ammonium nitrate exchange, the extrudate was washed with deionized water, e.g., to remove residual nitrate ions prior to drying. The ammonium exchanged extrudate was then dried at about 121° C. overnight (again, for about 8-16 hours) and calcined in air at about 538° C. for about 4-6 hours. After drying but before air calcination, the resulting dried catalyst was labeled Sample 3A. After air calcination, the resulting H-form catalyst was labeled Sample 3B. After air calcination, the resulting H-form catalyst was alternately treated with steam at about 700° F. (about 371° C.) for about 4 hours (the resulting steamed H-form catalyst was labeled as Sample 3C) or treated with steam at about 800° F. (about 427° C.) for about 4 hours (the resulting steamed H-form catalyst was labeled as Sample 3D).

The H-form extrudates (Samples 3B, 3C, and 3D) were analyzed to determine alpha value, BET surface area, hexane sorption, crush strength, and L/D based on a 3×6' drop test and on a 6×6' drop test. The properties of, and the results of specific testing on, each of the enumerated samples are shown in Tables 1-2 below.

Example 4—ZSM-48 Alumina-Bound Catalyst, Reinforced with 3% Glass Fibers

Figure 4A:
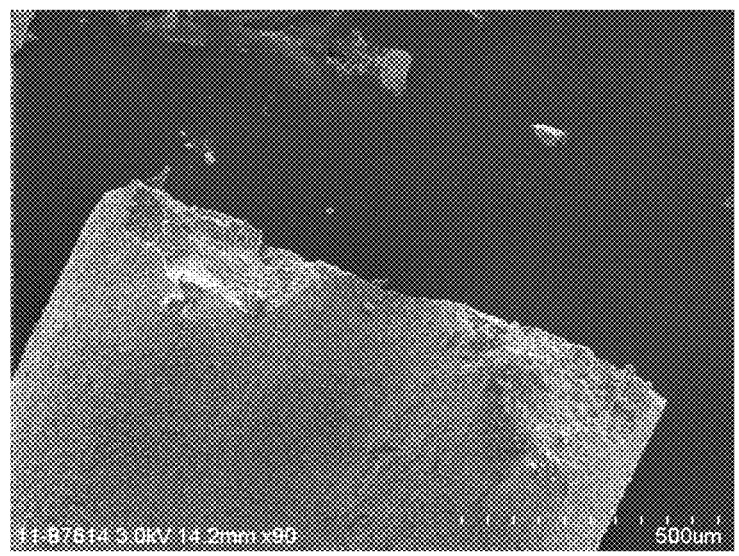
FIGS. 4A-4B show SEM images of a side view and a cross-section, respectively, of a quadrulobal reinforced extrudate of the invention, made according to Example 4.
Figure 4B:
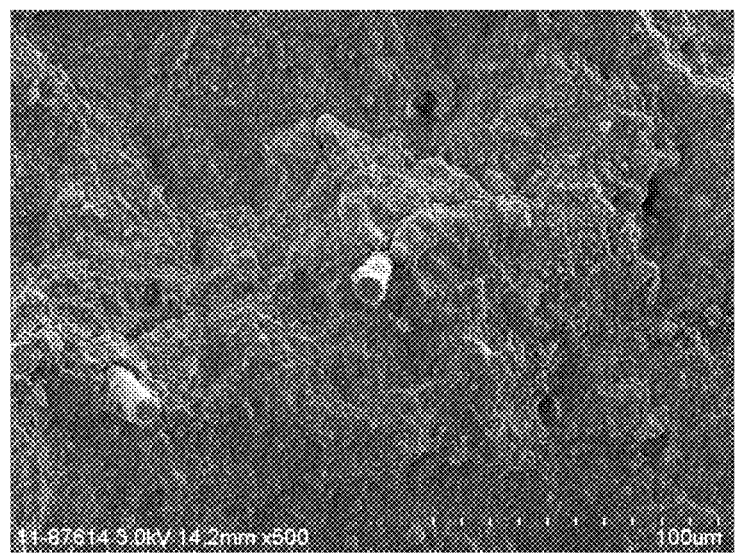

About 65 parts of high activity (~70/1 $Si/Al_2$ ratio) ZSM-48 zeolite crystal (on the basis of the weight of the as-calcined material treated at ~538° C. for ~4-6 hours) were mixed with about 35 parts of Versal™ 300 pseudoboehmite alumina binder (commercially available from UOP of Des Plaines, Iowa, USA; on the basis of the weight of the as-calcined material treated at ~538° C. for ~4-6 hours) in a muller. Sufficient water containing about 3 parts calcined (polymer coating removed) E-glass fibers (relative to the ~100 parts of combined catalytic crystalline material and metal oxide binder) was added to produce an extrudable paste on a ~2" Bonnot™ extruder. The mixture of ZSM-48, pseudoboehmite alumina, E-glass fibers, and water was extruded into ~1/20" quadralobes and then dried in a hotpack oven at about 121° C. overnight (for about 8-16 hours). Scanning electron microscope images of the resulting dried extrudates are shown in FIGS. 4A-4B.

The dried extrudate was calcined in nitrogen at about 538° C., e.g., to remove and/or mostly or completely decompose the organic template. The $N_2$ calcined extrudate was then humidified with saturated air and exchanged with ~1N ammonium nitrate to remove alkali atoms such as sodium (spec≈<500 ppm Na). After ammonium nitrate exchange, the extrudate was washed with deionized water, e.g., to remove residual nitrate ions prior to drying. The ammonium exchanged extrudate was then dried at about 121° C. overnight (again, for about 8-16 hours) and calcined in air at about 538° C. for about 4-6 hours. After drying but before air calcination, the resulting dried catalyst was labeled Sample 4A. After air calcination, the resulting H-form catalyst was labeled Sample 4B. After air calcination, the resulting H-form catalyst was alternately treated with steam at about 700° F. (about 371° C.) for about 4 hours (the resulting steamed H-form catalyst was labeled as Sample 4C) or treated with steam at about 800° F. (about 427° C.) for about 4 hours (the resulting steamed H-form catalyst was labeled as Sample 4D).

The H-form extrudates (Samples 4B, 4C, and 4D) were analyzed to determine alpha value, BET surface area, hexane sorption, crush strength, and L/D based on a 3×6' drop test and on a 6×6' drop test. The properties of, and the results of specific testing on, each of the enumerated samples are shown in Tables 1-2 below.

TABLE 1

Property Summary on Samples from Examples 1-4

| Sample | Alpha | BET SA[1] | Hexane Sorp.[2] | Crush Str.[3] |
|---|---|---|---|---|
| Sample 1B (unreinforced, H-form) | 70 | 292/(75 + 217) | 41 | 110 |
| Sample 2A (1 wt % fiber) | | | | 105 |
| Sample 2B (H-form) | 68 | | | 116 |
| Sample 2C (Steamed 700 F./4 hrs) | 110 | 259/(43 + 216) | 27.2 | 101 |
| Sample 2D (Steamed 800 F./4 hrs) | 90 | 260/(46 + 215) | 25.2 | 105 |
| Sample 3A (3 wt % fiber) | | | | 82 |
| Sample 3B (H-form) | 64 | | | 106 |
| Sample 3C (Steamed 700 F./4 hrs) | 96 | 256/(49 + 207) | 27 | 91 |
| Sample 3D (Steamed 800 F./4 hrs) | 74 | 225/(30 + 194) | 24.3 | 99 |
| Sample 4A (3% calcined fiber) | | | | 98 |
| Sample 4B (H-form) | 69 | 296/(84 + 211) | 33.3 | 100 |
| Sample 4C (Steamed 700 F./4 hrs) | 110 | 255/(53 + 202) | 26.6 | 103 |
| Sample 4D (Steamed 800 F./4 hrs) | 83 | 254/(51 + 202) | 24.1 | 99 |

[1]Total SA, in m$^2$/g - parenthetical represents micropore SA + external (mesopore) SA
[2]Hexane Sorption, in milligrams n-hexane sorbed per gram of sample
[3]Crush strength, in lbs-force/in.

TABLE 2

L/D Analysis on Green Extrudates

| | As-Extruded | 3 × 6' dropped | 6 × 6' dropped |
|---|---|---|---|
| Sample 1A (unreinforced) | | 3.23 | 2.69 |
| Sample 2A (1 wt % fiber) | 6.36 | 4.21 (+30%) | 2.99 (+11%) |
| Sample 3A (3 wt % fiber) | 6.82 | 4.57 (+41%) | 4.17 (+55%) |
| Sample 4A (3 wt % calcined fiber) | 6.87 | 3.89 (+20%) | 3.15 (+17%) |

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A reinforced catalytic microporous and/or mesoporous bound extrudate comprising:
    a catalytic crystalline microporous and/or mesoporous material,
    a metal oxide binder; and
    a reinforcing glass fiber having a diameter from 5 microns to 100 microns and a length-to-diameter ratio from 500:1 to 3000:1,
    wherein the reinforcing glass fiber is present in an amount from about 1 part to about 50 parts by weight, based on about 1000 parts by weight combined of catalytic crystalline material and metal oxide binder; and,
    wherein the extrudate comprises a quadralobe.

2. The extrudate of claim 1, wherein the catalytic crystalline microporous and/or mesoporous material comprises a zeolite.

3. The extrudate of claim 2, wherein the zeolite comprises ZSM-5, ZSM-11, ZSM-12, ZSM-22, ZSM-23, ZSM-48, ZSM-57, boggsite, chabazite, epistilbite, erionite, faujasite, ferrierite, levyne, montesommaite, mordenite, offretite, stilbite, theta-1, zeolite A, zeolite beta, zeolite L, zeolite X, zeolite Y, MCM-22, MCM-41, MCM-56, MCM-68, SAPO-11, SAPO-56, or combinations or intergrowths thereof.

4. The extrudate of claim 1, wherein the reinforcing glass fiber has a diameter from 5 microns to 30 microns and a length-to-diameter ratio from 500:1 to 1500:1.

5. The extrudate of claim 1, wherein the reinforcing glass fiber is present in an amount from about 10 parts to about 30 parts by weight, based on about 1000 parts by weight combined of catalytic crystalline material and metal oxide binder.

6. The extrudate of claim 1, wherein the catalytic crystalline material is present in an amount from about 500 parts to about 900 parts by weight, and wherein the metal oxide binder is present in an amount from about 100 parts to about 500 parts by weight, such that the combination of catalytic crystalline material and metal oxide binder comprises about 1000 parts by weight.

7. The extrudate of claim 1, wherein the reinforcing glass fiber is E-glass fiber.

8. The extrudate of claim 1, wherein the extrudate is a calcined reinforced catalytic microporous and/or mesoporous bound catalyst.

9. The extrudate of claim 8, wherein the calcined reinforced catalytic microporous and/or mesoporous bound catalyst is a steamed reinforced catalytic microporous and/or mesoporous bound catalyst that exhibits one or more of the following properties:
    an alpha value of at least about 70;
    a BET surface area of at least about 250 m2/g;
    a hexane sorption of less than about 40 mg per gram of catalyst; and
    a crush strength of at least about 90 lbs-force/in (about 15.9 N/mm).

* * * * *